J. A. SWINDELL.
APPARATUS FOR OBTAINING A MEASURED FEED.
APPLICATION FILED MAY 14, 1908.
917,378.
Patented Apr. 6, 1909.
2 SHEETS—SHEET 1.
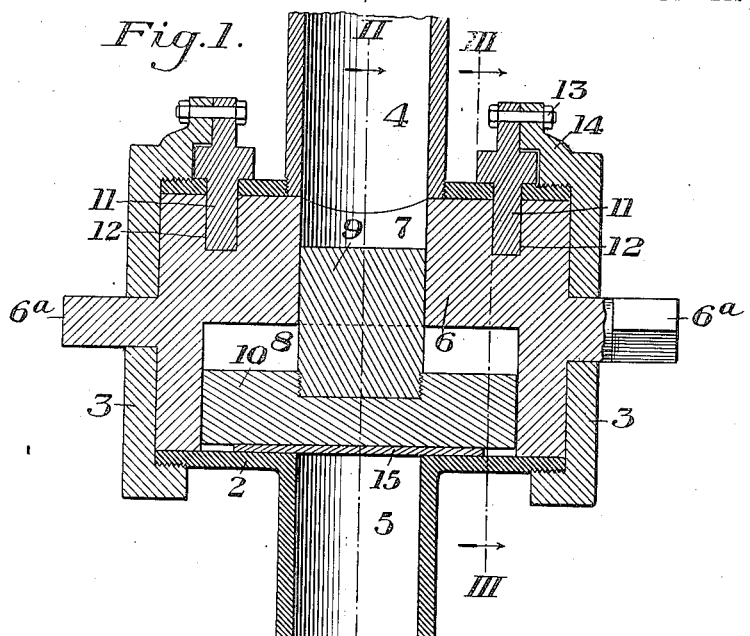
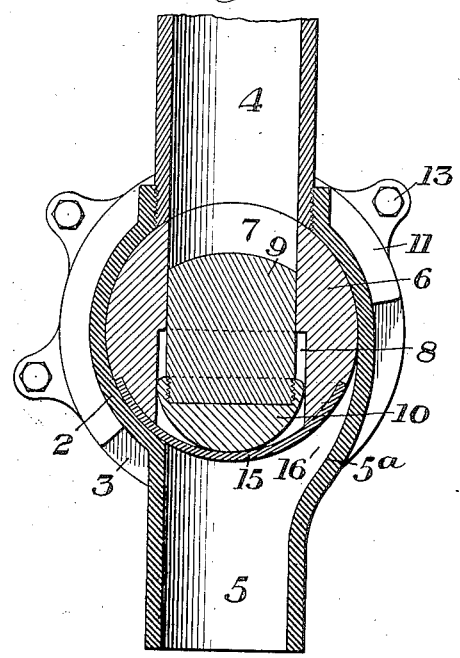
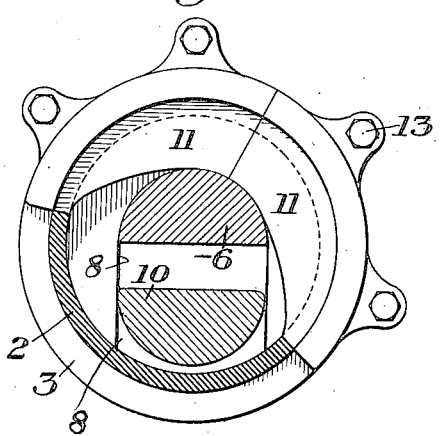
WITNESSES
R A Balderson
G. B. Bleming
INVENTOR
J. A. Swindell,
by Bakewell, Byrnes & Parmelee,
his Attys.

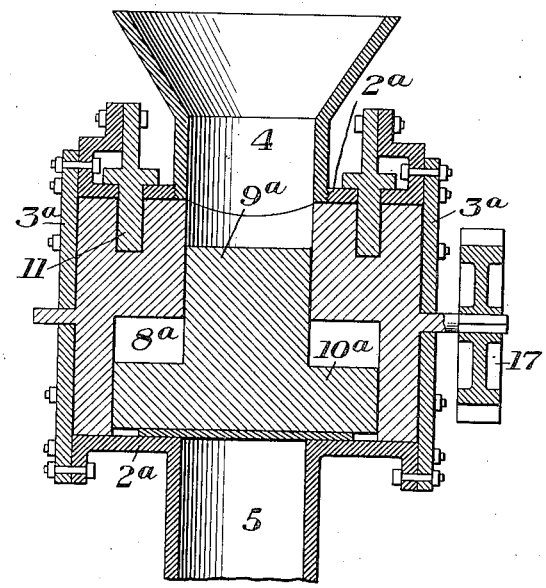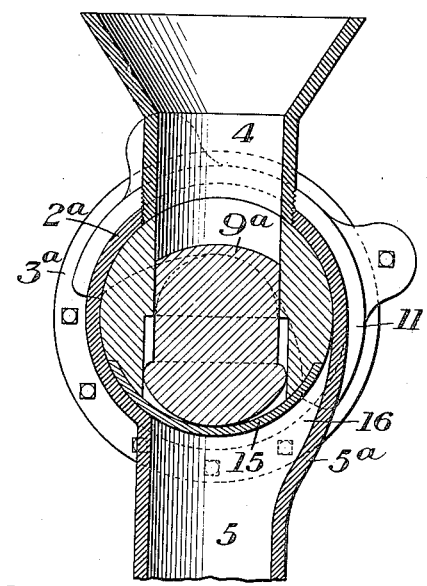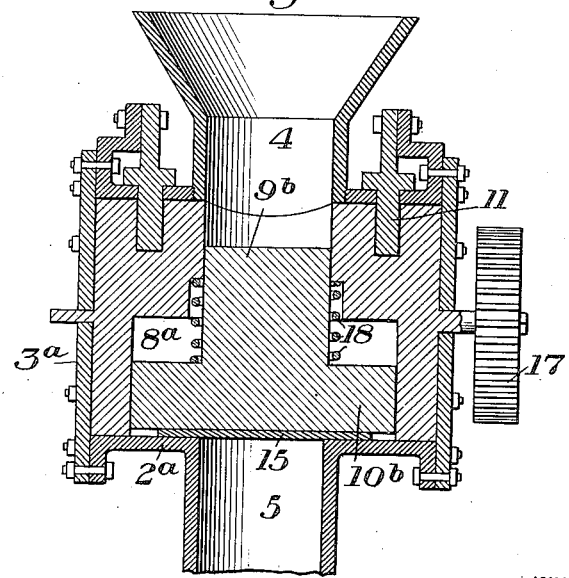

UNITED STATES PATENT OFFICE.

JOHN A. SWINDELL, OF RESERVE TOWNSHIP, ALLEGHENY COUNTY, PENNSYLVANIA.

APPARATUS FOR OBTAINING A MEASURED FEED.

No. 917,378.  Specification of Letters Patent.  Patented April 6, 1909.

Application filed May 14, 1908. Serial No. 432,820.

*To all whom it may concern:*

Be it known that I, JOHN ALBERT SWINDELL, of Reserve township, in the county of Allegheny and State of Pennsylvania, have invented a new and useful Apparatus for Obtaining a Measured Feed, of which the following is a full, clear, and exact description, reference being had to the accompanying drawings, forming part of this specification, in which—

Figure 1 is a longitudinal section of one form of apparatus embodying my invention; Figs. 2 and 3 are sections on the lines II—II and III—III respectively of Fig. 1; Figs. 4 and 5 are sectional views similar to Figs. 1 and 2 respectively, showing a modified form of the apparatus; and Fig. 6 is a view similar to Fig. 1, showing another modification.

My invention has relation to apparatus for obtaining a measured feed of fuel, grain or other materials.

The invention is particularly adapted for use for feeding successive measured charges of fuel to a gas producer or boiler furnace, but may be used for other purposes.

The precise nature of my invention will be best understood by reference to the accompanying drawings, in which I have shown several embodiments thereof, and which will now be described, it being premised, however, that various changes may be made in the construction and arrangement of the parts by those skilled in the art without departing from the spirit and scope of my invention as defined in the appended claims.

Referring first to the construction shown in Figs. 1, 2 and 3, the numeral 2 designates a cylindrical shell or casing, whose ends are closed by heads 3, which are screwed upon the threaded ends of the cylinder 2. The cylinder 2 is provided at one side, preferably at the top, with an inlet opening 4, and directly opposite thereto is an outlet opening and connection 5. Rotatably arranged within the casing or shell 2 is a body 6 formed with an opening 7, which communicates with a cut-away portion 8.

9 designates a plunger, which works within the opening 7 in the body 6, and which is carried by the head 10 which is seated and works in the cut-away portion 8.

11 designates segmental cam rings, which project inwardly through slots in the cylinder 2 and into engagement with grooves 12 in the body 6. These cam rings may be secured in any suitable manner, as by being bolted as shown at 13 to projecting flanges 14 of the heads 3. Inasmuch as each of the cam rings extends around somewhat more than one-half a circumference, they are preferably made in two sections, as indicated in Fig. 3, for convenience in assembling and removing. The cut-away portion 8 is closed by a metal piece 15, which is secured to the body 6.

The operation is as follows:—When the parts are in the position shown in Fig. 1, the plunger 9 is in its lowest position and the space above the plunger within the opening 7 of the body 6 forms a pocket for the reception of a definite quantity of the material to be measured and fed. When this pocket is filled, the body 6 is rotated, and the cams 12 begin to act upon the head 10 to force the plunger upwardly or outwardly into the hole 7, until at the time the said hole is brought into line with the discharge opening 5 the plunger 7 will have been moved to a point where its outer end face is flush with the cylindrical surface of the body 6. In order to prevent compression of the material contained in said pocket, the cams 12 are so shaped that the outward movement of the plunger does not commence until the body 6 has been rotated some distance away from its receiving position toward its discharging position and the wall 5ᵃ of the discharge opening 5 is flared upwardly and outwardly to form the clearance space 16, whereby the material can commence to discharge as soon as the plunger has an appreciable outward movement. The outer face of the plunger is preferably made of convex form, conforming to the curvature of the body 6 so that when the plunger is at its outermost position its end surface will conform to the adjacent surface of said body. This prevents any space in which any of the material can lodge, and effects a complete discharge of such material. The inner edges of the cam rings 12 are so shaped that the plunger will not commence its retracting movement until it has passed the discharge opening 5 and is on its way upwardly, so that the pocket formed by the opening 7 remains entirely closed by the plunger until it has been carried past the discharge opening. This avoids any space or pocket which can become filled with gases where the device is used for feeding furnaces. It is for this reason that the apparatus is especially designed for feeding gas producers, and other furnaces, since there is no opportunity for any of the gases from the furnace to escape during the operation of the fuel discharge.

The body 6 may be rotated by any suitable means, being shown as provided with extended shafts or journals 6ª. A pipe or conduit can be connected to the discharge connection 5 and lead to any desired point. In the case of a gas producer, such pipe or conduit will extend downwardly through the top of the furnace to the feed opening thereof, while in the case of an under-feed boiler furnace this pipe or connection would lead underneath the grate and upwardly to the fuel-feeding opening of the furnace. The apparatus may also be used as a grain elevator, in which case the pipe or conduit in the opening 5 can be led upwardly to any desired point of discharge.

In the modification shown in Fig. 4, the construction is the same as that first described, except that the end heads 3ª of the outer casing or shell are shown as bolted to the cylinder 2ª, and the plunger 9ª is shown as being formed in one piece with the head 10ª instead of in a separate piece, as in the construction first described. In this view, I have shown one of the shafts or journals of the rotating body 6 as having a driving wheel 17.

The modification shown in Fig. 6 is of substantially the same construction as that shown in Fig. 4, but I have shown a spring 18 surrounding the plunger 9ᵇ and seated between the head 10ᵇ and the inner wall of the cut-away portion 8ª for the purpose of positively retracting the plunger. In the form first described, the retraction of the plunger is effected mainly by gravity, and in some cases it is possible that it might become wedged by the particles of material so that it might stick or fail to operate properly. This can be prevented by the provision of a spring, such as shown in Fig. 6.

It will be noted that there are no parts of the device of a character likely to be injured by heat, so that the apparatus can be used in close proximity to the furnace to be fed.

Where the parts are arranged as shown in the drawings, the cams 12 may be in some cases dispensed with and gravity relied upon to operate the plunger.

Various other changes may be made in the details of construction and arrangement.

What I claim is:—

1. In apparatus of the character described, the combination of a closed casing or shell, a cylindrical body rotatably mounted therein and having an opening or pocket, a plunger working in said opening or pocket and having a head seated in a cut-away portion of the body, and cam rings secured to the shell and projecting inwardly into actuating engagement with said head; said body having grooves into which the cam rings extend, said cams effecting a reciprocation of the plunger during each rotation of the body substantially as described.

2. In apparatus of the character described, the combination of an inclosing casing or shell having an inlet opening and a discharge opening, of a cylindrical body rotatably mounted in said casing or shell and having a pocket in one side thereof, the opposite side of the body having a portion of its periphery cut away; and a plunger seated in said pocket and having a head extending parallel with the axis of the cylindrical body and seated in the cut-away portion thereof together with cam means engaging each end portion of said head and arranged to reciprocate the plunger once for each rotation of the body; substantially as described.

3. In apparatus of the character described, the combination of an inclosing casing or shell having an inlet opening and a discharge opening, of a cylindrical body rotatably mounted therein, said body having a radial pocket, and a cut-away portion into which the pocket opens at its bottom, a plunger working in the pocket, a head attached to the plunger and movable in the cut-away portion of the body, and cam means for engaging the head to actuate it and the plunger to reciprocate the plunger during each revolution of the body, the rear wall of the discharge opening being flared rearwardly to provide a clearance space; substantially as described.

4. In apparatus of the character described, the combination with a casing or shell, of a cylindrical body rotatably mounted therein and formed with grooves, said body having a pocket extending into it at one side, and a cut-away portion at the opposite side with which the pocket communicates, a plunger working in the pocket and having a head seated in the cut-away portion of the body, and cam rings secured to the casing or shell and extending inwardly into the grooves in the cylindrical body into position to engage the respective end portions of the plunger head as the body is rotated; substantially as described.

5. In apparatus of the character described, the combination with a casing or shell, of a body rotatably mounted therein, said body having a pocket extending therein at one side, and a cut-away portion at its opposite side into which the pocket opens, a plunger working in said pocket and having a head portion seated in the cut-away portion of the body, cam means for reciprocating the plunger during each rotation of the body and a plate secured to the body over its cut-away portion; substantially as described.

6. In apparatus of the character described a rotatable body having an opening or pocket extending therethrough, a plunger arranged to reciprocate in said pocket, and stationary cams located at opposite sides of the plunger and engaging the same as the body is rotated to actuate said plunger; substantially as described.

In testimony whereof I have hereunto set my hand.

JOHN A. SWINDELL.

Witnesses:
H. M. CORWIN,
GEO. H. PARMELEE.